UNITED STATES PATENT OFFICE.

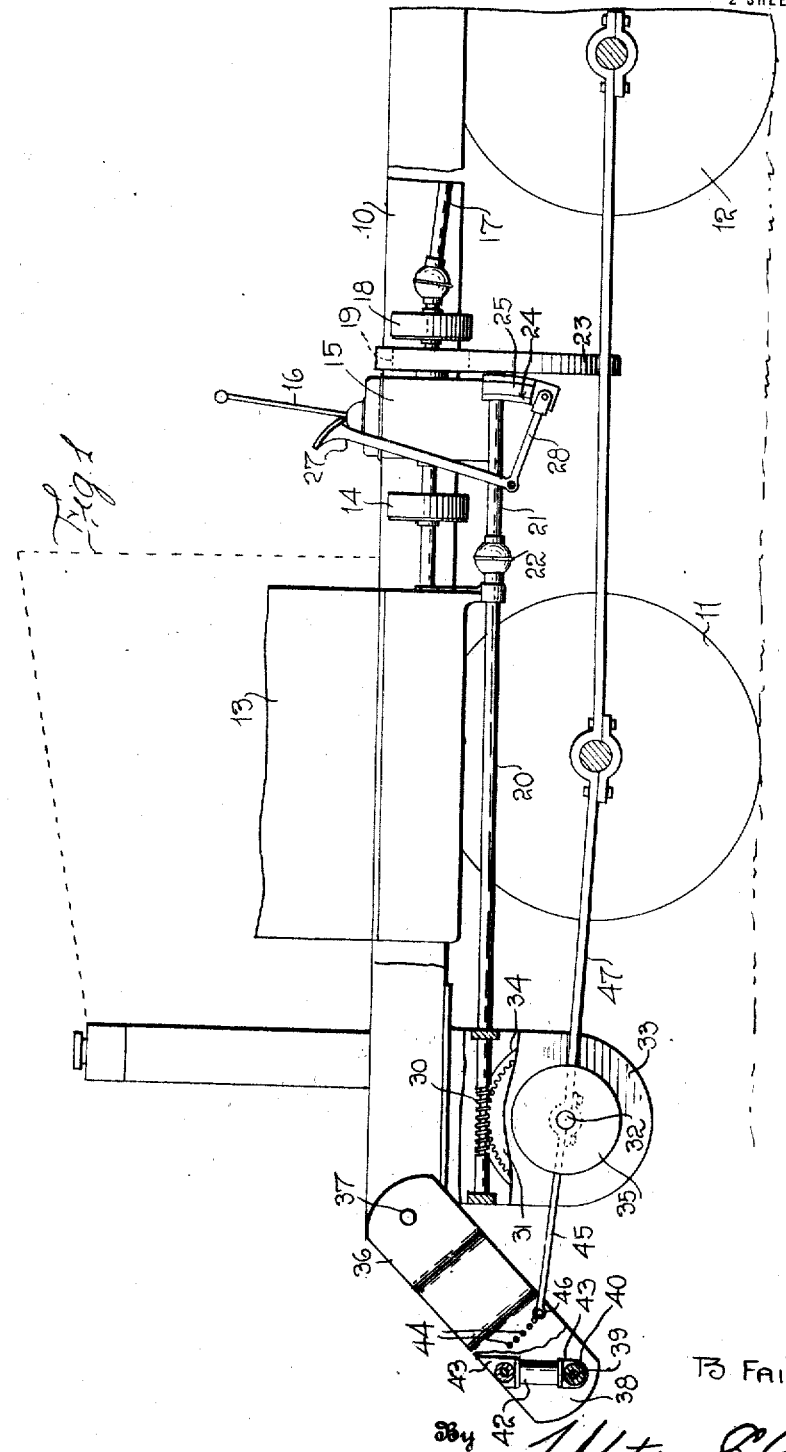

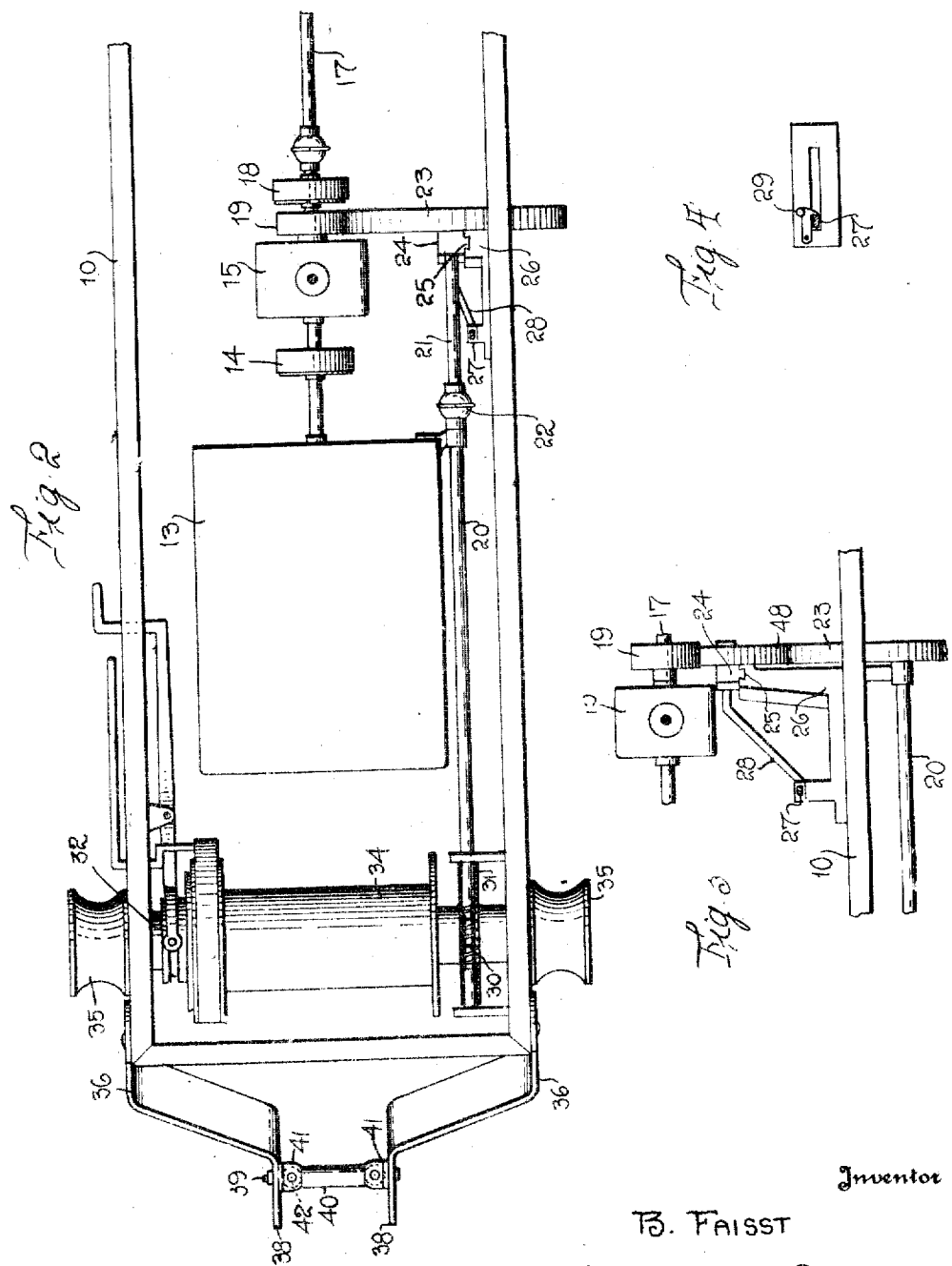

BERNHARD FAISST, OF SILICA, ARKANSAS.

POWER-WINCH FOR AUTOMOBILE-TRUCKS.

1,269,804.   Specification of Letters Patent.   Patented June 18, 1918.

Application filed September 24, 1917. Serial No. 192,967.

*To all whom it may concern:*

Be it known that I, BERNHARD FAISST, a citizen of the United States, residing at Silica, in the county of Saline and State of Arkansas, have invented certain new and useful Improvements in Power-Winches for Automobile-Trucks, of which the following is a specification, reference being had to the accompanying drawings.

This invention relates to tractors or trucks driven by power, and particularly to the provision of a power operated winch mounted upon the truck and adapted to be thrown into gear with the motor on the truck or the driving mechanism thereof, whenever it is desired to use the winch.

The general object of the invention is to provide a winch upon a power operated truck, which winch will furnish power by which the truck may be pulled out of mud or when it is mired in soft ground, without the necessity of using the power of the rear driving wheels. Attempting to force a mired truck forward by the drive wheels alone usually causes these drive wheels to dig themselves in deeper with each turn that they make.

A further object is to provide a winch which can be used to great advantage to pull the truck over steep hills with a heavy load or which may be used for extra heavy pulls in connection with a single or multiple block.

Another object is to provide a winch which can also be used for hoisting purposes, in other words, provide a power operated truck carrying a winch which truck may be transported under its own power to the place desired and then the power disconnected from the driving wheels and connected to the winch so that the winch may be used for hoisting or loading.

A further object is to provide a truck of this character in which the driving shaft carries a friction wheel and the driven shaft, which is connected to the winch also carries a friction wheel, there being means whereby these friction wheels may be operatively connected to or disconnected from each other, this means preferably including a foot lever.

Other objects will appear in the course of the following description.

My invention is illustrated in the accompanying drawings, wherein:—

Figure 1 is a side elevation of a motor truck with my power operated winch applied thereto;

Fig. 2 is a top plan view of the construction shown in Fig. 1;

Fig. 3 is a fragmentary plan view showing a modified form of the power transmission means; and Fig. 4 shows the means for holding the pedal 27 in adjusted position.

Referring to these drawings, 10 designates the truck frame, which may be of any suitable construction and is mounted upon the forward wheels 11 and the rear driving wheels 12. The motor or engine 13 is connected through the usual clutch 14 to the gear shifting mechanism, which is housed within the usual casing 15 and operated by means of the usual gear shifting lever 16. By means of the gear shifting mechanism the truck may be driven forward at a plurality of speeds or driven rearward as usual. A driven shaft 17 extends from the gear shifting casing and is operatively connected to the rear wheels in any usual or ordinary manner. All of these parts are of ordinary construction and are such as are commonly found in power driven trucks. The driving shaft 17 is preferably made in two sections, and rearward of the gear shifting casing 15 or at any suitable point, these sections are connected by means of any type of clutch 18, one section of which is shiftable in the usual manner so that the rear portion of the driving shaft 17 may be disconnected from the forward portion, thus taking power off of the rear wheels or upon connecting the clutch, applying power to the rear wheels.

Mounted upon the forward section of the shaft 17, between the clutch 18 and the gear shifting casing 15, is a friction wheel 19. Mounted in suitable bearings, which may be of any desired character, is a longitudinally extending driven shaft 20, which is preferably formed in two sections, the rear section 21 being connected to the forward section by means of a flexible joint 22, so that the rear section 21 may be shifted in a vertical plane. This rear section 21 carries upon it the friction wheel 23, which is preferably larger than the friction wheel 19 and which is adapted to be shifted by means of the shaft 21 into or out of engagement with the friction wheel 19. I have shown the rear section 21 of the shaft 20 as being mounted at its rear end in a sliding bearing 24, which has a dove-tailed flange 25 engaging in a dove-tailed recess in a supporting bracket 26, so that the bearing 24 may be shifted vertically, to thereby carry the friction wheel 23 into or out of engagement with the friction wheel 19.

For the purpose of shifting the sliding bearing 24, I may provide any suitable lever. This lever may be hand operated or foot operated, but preferably it is a foot operated lever, in the form of a pedal. This lever, designated 27, is mounted upon the bracket 26, and has an arm 28, which is pivotally connected to the sliding block 24. A latch 29 holds the lever in position with the friction wheel 23 in engagement with the friction wheel 19.

The forward end of the shaft 20 is provided with a worm 30 engaging a worm wheel 31 on a capstan or windlass shaft 32, which is rotatably mounted in suitable bearings, preferably carried in depending extensions 33 on the truck frame, these extensions also carrying suitable bearings for the shaft 20. Mounted upon the shaft 32 is the drum 34. This drum is of the regular standard hoisting drum type, which is detachably clutched to the shaft 32 by usual clutching means and which is provided with the usual brake. Mounted upon the ends of the shaft 32 are the usual auxiliary drums or capstans 35.

Attached to the frame of the machine and extending forward and downward therefrom are the supporting arms 36. These arms are preferably pivoted, as at 37, to the beams 10 of the frame, and the arms extend inward toward each other and then downward and outward, as at 38. Extending across the ends 38 and connecting them are bolts 39, and mounted upon these bolts are sleeves 40 forming upper and lower horizontal rollers. Caps 41 and 43 are disposed between the ends of the sleeves and the inner faces of the portions 38 and mounted in these caps are vertical rollers 42. These rollers 40 and 42 form guides for the cable, the cable being passed between the vertically disposed rollers and also between the horizontally disposed rollers whereby it will always be maintained in operative position for use either for hoisting purposes, or for pulling the truck forward, if it should become stalled in soft ground or the like. The bolts 39 form braces between the arms 36 to hold the arms together.

Braces 45 extend to the shaft 32 of the hoisting drum and the outer ends of these braces are formed with eyes so that the bolts 46 may be inserted through these eyes and engaged in one of the perforations 44 to thereby hold the arms 36 in different adjusted positions. Longitudinal bracing rods 47 preferably connect the shaft 32 with the front axle, and these rods preferably extend back to the rear axle so as to have direct connection to the point of greatest resistance.

While preferably I dispose the shaft 20 and shaft section 21 between the side beam of the frame and the engine, yet some trucks are so constructed that the space between the frame is entirely filled by the engine and thus there is no room for the shaft to pass between the frame and the engine and in this case obviously the shaft can be carried on the outside of the frame. Under these circumstances, the distance between the shaft 17 and the shaft section 21 would be too great for the use of contacting friction wheels and hence in this case, I use the intermediate friction wheel 48, as illustrated in Fig. 3, this intermediate wheel being shiftable into or out of engagement with the driving and the driven wheels. The friction wheel is preferably made of iron though, of course, I do not wish to be limited to this, and where an intermediate friction wheel is used, the two friction wheels on the driven and driving shaft are both of iron.

Assuming that the main drive shaft 17 runs about 400 R. P. M. on slow gear, then the friction wheel 19 should be about 4" in diameter and have about a 4" face, while the iron friction wheel 23 should be about 12" in diameter. The worm gear should reduce the speed still further from about 16 or 20 to 1. The slow speed of the engine will be used to pull the truck out of a hole or over a steep hill and faster speeds could be used where the obstacles to be overcome are not so great, or in hoisting relatively light material. Since the drum 34 is loose upon the shaft 32, and therefore the cable can unwind when the drum 34 is unclutched from the shaft 32, a worm can be used which will hold the load when required. A reverse rotation of the drum, therefore, will not be necessary in most cases, but if it should be necessary, the transmission gearing may be thrown into reverse. If greater power be needed upon the drum, it is obvious that the ratios of the driving and driven friction gears can be changed and a worm with a greater ratio may be employed. It is obvious also that the power may be reduced by changing these ratios.

It will be understood that the motor truck shown in the drawings is purely illustrative and that only those parts of the truck have been illustrated which are necessary to make my invention clear, and that this truck may be constructed in many different ways, without departing from the spirit of the invention and that I do not wish to be limited to the exact arrangement of the parts shown in the drawings.

Having thus described my invention, what I claim is:—

1. A power operated truck including a motor, a rear axle, a sectional drive shaft extending from the motor to the rear axle, a clutch connecting said sections, a driving wheel operatively connected to one of said sections between the motor and the clutch, a winding drum, a shaft therefor, a worm wheel on the shaft, a shaft having a worm engaging said worm wheel, a shaft section having a universal joint connection to the worm shaft, a gear wheel mounted upon said shaft section, and means for shifting said gear wheel into or out of engagement with the first named driving gear wheel.

2. A power operated truck including a motor, a rear axle, a sectional driving shaft extending from the motor to the rear axle, a clutch for connecting said sections, a driving wheel operatively connected to one of said sections between the motor and the clutch, a winding drum, a shaft therefor, a worm wheel on the shaft, a shaft having a worm engaging said worm wheel, a shaft section having a universal joint connection to the worm shaft, a gear wheel mounted upon said shaft section, a bearing for said shaft section, a support for said bearing with which the bearing has sliding engagement for movement toward or from the first named drive wheel, and a lever operatively connected to said sliding bearing for shifting it.

3. A power operated truck comprising a frame having forward and rear wheels, a motor mounted on the frame, a shaft section operatively connected to the motor and driven thereby, a second shaft section operatively connected to the rear driving wheels, a clutch connecting said second shaft section to the first shaft section, a gear shifting mechanism disposed between the motor and said clutch, a friction wheel mounted upon the first named shaft section between the gear shifting mechanism and the clutch, a drum shaft operatively supported upon the frame, a drum loose thereon, means for clutching the drum to or unclutching it from the drum shaft, a worm wheel mounted upon the drum shaft, a shaft extending longitudinally and carrying a worm engaging the worm wheel, a shaft section having a flexible connection with the worm shaft, a friction wheel thereon coacting with the first named friction wheel, and a lever operatively engaged with said last named shaft section, whereby it may be shifted to carry the friction wheels into engagement with each other.

4. A truck including an axle, a motor, a winding drum mounted on the truck and including a shaft driven by the motor, a shiftable cable guide mounted on the truck, and braces connecting said axle to the cable guide, the cable guide having a plurality of perforations and the braces having at their extremities means engaging in said perforations whereby the angle of the cable guide may be adjusted and whereby the braces will hold it in its adjusted position and against strain.

5. A power operated truck including a motor therefor, a shaft adapted to be operatively connected to or disconnected from the motor, a driving wheel mounted thereon, a winding drum, a shaft therefor, a worm wheel carried by the shaft, a shaft having a worm engaging said worm wheel, a shaft section having a universal joint connection to the worm shaft, a drive wheel mounted upon said shaft section, a bearing for said shaft section, a support for said bearing with which the bearing has shiftable engagement for movement toward or from the first named drive wheel, and a lever operatively connected to the bearing for shifting it so as to carry the drive wheel on said last named shaft into or out of engagement with the drive wheel on the first named shaft.

In testimony whereof I hereunto affix my signature in the presence of two witnesses.

BERNHARD FAISST.

Witnesses:
VIOLET J. DOWRICK,
M. R. WILSON.